Figure 1:
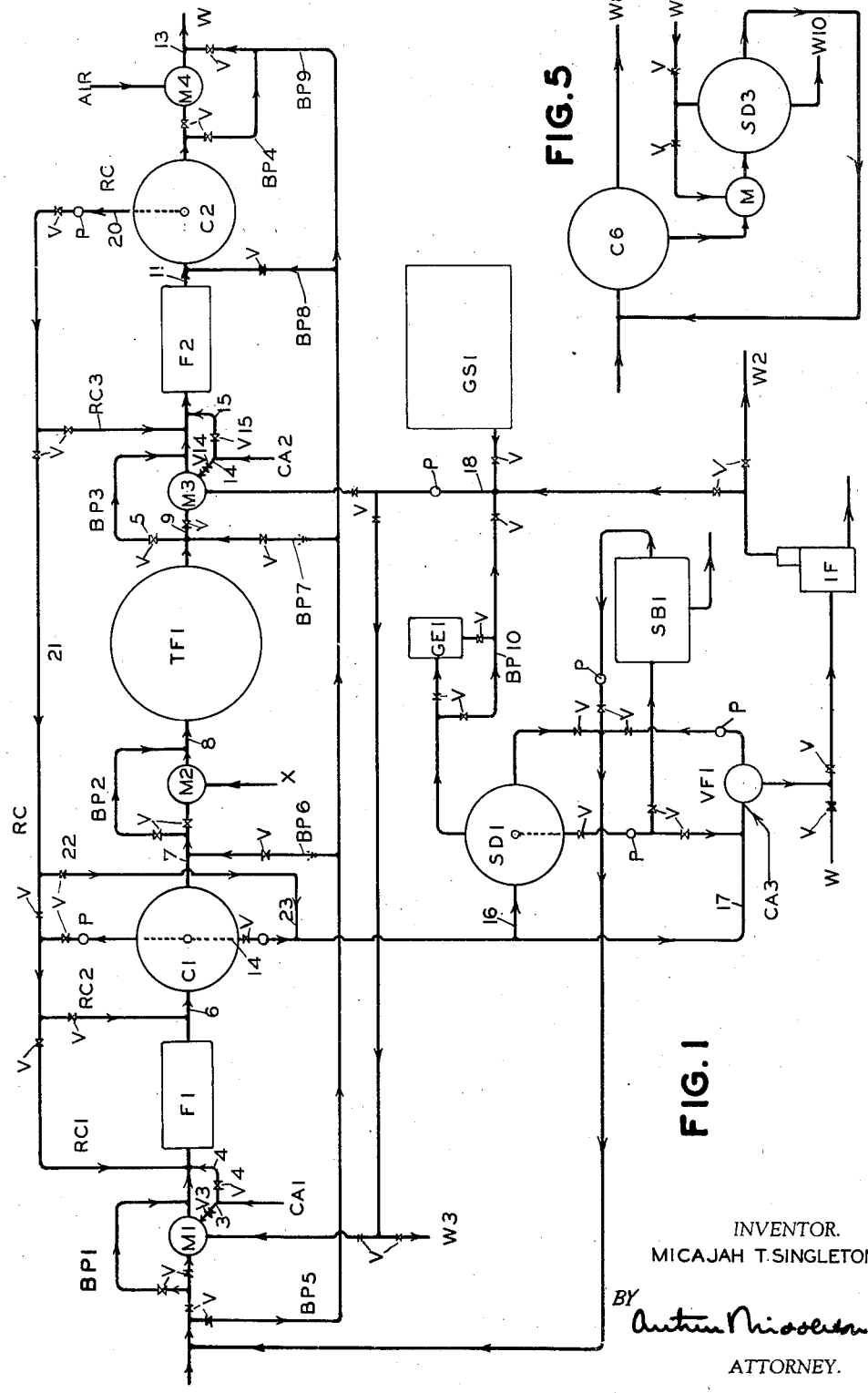

April 9, 1940.  M. T. SINGLETON  2,196,840
SEWAGE TREATMENT
Original Filed Oct. 11, 1935    2 Sheets-Sheet 2

INVENTOR.
MICAJAH T. SINGLETON
BY
ATTORNEY.

Patented Apr. 9, 1940

2,196,840

UNITED STATES PATENT OFFICE 2,196,840

SEWAGE TREATMENT

Micajah T. Singleton, Atlanta, Ga.

Application October 11, 1935, Serial No. 44,593
Renewed May 17, 1939

8 Claims. (Cl. 210—2)

This invention relates to the treating of sewage, trade waste liquors, or other form of impure waters or mixtures thereof. According to one aspect of the invention it particularly pertains to adjusting or insuring an optimum pH value for the most effective and economical employment of coagulants or chemicals that are relied upon for effecting a coagulating, or a precipitating, or a coagulating and precipitating of either suspended solids or colloidal matter, or of both, in order to obtain an early elimination or substantial removal of such matter whereby a relatively clear or a relatively clarified effluent is realized.

The present invention, according to an aspect thereof more specifically expressed, revolves about the employment of a $CO_2$ bearing gas either as pure $CO_2$ or as a substantial component of a gaseous product—such as any form of flue gas or other burned gas, engine exhaust gas, incinerator stack gas or sewage digester gas as directly produced as the result of sewage sludge digestion or even after burning or other combustible utilization thereof—for insuring or assisting the pH value to an optimum value below 7, according to which many coagulating or precipitating agents can be more economically employed than according to present-day practice. The $CO_2$ bearing gas constitutes a conditioning agent and accomplishes the desired end in a relatively automatic manner because it can be employed in quantities sufficient to accomplish the desired end, for example to bring the pH value to that at which water will no longer absorb the $CO_2$, and a continued excess supply of $CO_2$ will not detrimentally affect the end desired to be accomplished by its employment.

The present invention as carried out contemplates the conditioning of the sewage, trade waste liquors, or other impure waters, as the case may be, by the introduction or mixing therewith or the intimate contacting therewith of the $CO_2$ bearing gas, thereafter intimately mixing with the conditioned sewage or other conditioned liquid being treated the desired or particular chemical. The preconditioning by the application or introduction of $CO_2$ bearing gas into the liquid being treated is preferably carried out under conditions to lower the pH value or, as otherwise expressed, to insure that the pH value of the liquid being treated is within an approximately pH value range of 6.2 to 5.2, the latter being approximately the lowest pH value which can be economically realized by the utilization of $CO_2$ or by the utilization of a $CO_2$ bearing gas.

The pH range mentioned is that which is favorable to realizing the advantageous features of the present invention.

The preconditioning and the chemical application just referred to, or either of them, is then preferably followed by the employment of gentle agitative effects favorable to flocculation, that is to the formation or assemblage of the suspended and colloidal matter into the form of flocs, and ultimately by sedimentation, after which the supernatant liquid is withdrawn as clarified effluent and passes along one path as to waste or other place of disposal therefor or to place of utilization thereof while the sedimented settled solids are withdrawn and suitably disposed of as by digesting or as by dewatering and other subsequent disposal operation as by burning, to wit incineration.

According to another aspect of the invention, sewage, sewage sludge, trade wastes or other impure waters are subjected to a $CO_2$ bearing gas prior to biological treatment such as on a trickling filter, by the activated sludge process, or by digestion. In this case the subjecting of the liquid or sludge being treated to a $CO_2$ bearing gas is for the purpose of reducing the alkalinity of a highly alkaline liquid or sludge such as sewage, sewage sludge, trade waste, or other form of liquid bearing organic impurities, to a point at which biological action will take place and proceed at an optimum rate, other conditions for optimum operation being present. In this connection it is pointed out that in many instances sewage coming in for treatment is frequently heavily loaded with trade wastes which impart high alkalinity thereto, and the phase of the invention just referred to has particularly in view the treating of sewages and trade waste liquors of this type.

This invention according to one phase thereof relates to the use of carbon dioxide gas recovered as a by-product of sewage disposal, either from the digester gases where sewage sludge is digested or from stack or flue gases when sludge or screenings are burned, or the use of $CO_2$ produced by the combustion of any fuel or recovered from natural gases, for the purpose of aiding or increasing the effectiveness of coagulation and precipitation of suspended solids or colloidal matter where an acid or an acidic metallic salt is used as a coagulant and it is found the effectiveness of such coagulant is increased by lowering the pH value of the sewage and/or other waste liquid.

Where acids such as sulphuric acid or metallic salts, such as ferric chloride, ferric sulphate, chlorinated copperas, aluminum sulphate and other chemical reagents having a strong acid radical are applied to sewage and/or waste liquids or other impure waters or mixtures thereof, for the purpose of coagulating and precipitating the suspended solids or colloidal matter or both, the effectiveness of such treatment and the quantity of coagulant required for a given degree of clarification is dependent to a great degree upon the hydrogen-ion concentration (pH value) of the liquid waste treated. The optimum pH value for most effective and economical coagulation may vary with different coagulants and with the character of the wastes to be treated, but, generally speaking, the coagulants used in the treatment of sewage are more effective in two different pH ranges—one appreciably on the alkaline side of neutrality and the other appreciably on the acid side of neutrality.

It so happens that municipal sewage is generally approximately neutral or very slightly alkaline, with a pH value of 7.0 to 7.5, being at times more acid or alkaline, depending upon the character of the water supply or nature of industrial wastes present.

While the suspended solids and colloidal matter in sewage can be coagulated if sufficient quantities of certain chemicals are applied, it is generally more economical to adjust the pH value either to a point near the alkaline optimum by adding lime or other alkaline substance or to a point near the acid optimum by the addition of an acid such as sulphuric acid and the like. Such preliminary pH adjustment with a cheaper chemical reagent permits of the use of smaller quantities of the more expensive chemical used as the coagulant, and produces better clarification at less overall expense.

The general trend heretofore, where pH adjustment has been practiced, has been to use lime to raise the pH to approximately 9.0 or higher when iron salts are used as the coagulant. Equal or better results can be realized in most instances by lowering the pH with acid to 5.5, or lower, depending upon the particular sewage treated.

The comparative cost of lime or acid treatment is dependent on the local cost of the chemicals used and the character of the sewage being treated.

Acid pH adjustment has not met with favor in the past, first: because of the fear of damage to plant structures and equiment due to the presence of sulphuric acid, which is the acid generally used; second: because of the fear of the after-precipitation effects when such acid sewage is discharged into streams; and also because of the more important difficulty, namely, that of danger of overdosing with acid at certain times because of varying quantities and character of sewage or other waste liquid supply due to the fact that the acid is not self-regulating as to pH value adjustment in the same manner as $CO_2$ addition.

This invention as above indicated relates to the introduction of carbon dioxide gas in sewage trade waste or other impure water for the purpose of adjusting the pH value thereof by increasing the hydrogen-ion concentration of the liquid or, otherwise expressed, by lowering the pH value for the purpose of effecting a saving in the quantities of chemicals used as coagulant or for increasing the effectiveness of such coagulants when coagulants are applied to sewage and/or other waste liquids for the purpose of precipitating suspended solids or colloidal matter.

The pH value adjustment effected by $CO_2$ is caused not only by the reduction of hydroxides to bicarbonates but further by the direct ionization of the carbonic acid formed by the excess $CO_2$ introduced. The acid resulting from the introduction of $CO_2$ in the water of the sewage is a weak acid and will not damage structures or equipment, if reasonable protective measures are practiced, and therefore a $CO_2$ bearing gas becomes a feasible and practicable adjusting agent or reagent.

The invention possesses other objects, aspects and features of advantage, some of which with the foregoing will be set forth in the following description. In the following description and in the claims, parts will be identified by specific names for convenience, but they are intended to be as generic in their application to similar parts as the art will permit. In the accompanying drawings there have been illustrated the best embodiments of the invention known to me, but such embodiments are to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Figure 1 diagrammatically illustrates a relatively complete sewage treating system clearly indicating the modes and location of using a $CO_2$ bearing gas prior to the sedimenting or settling out of chemically precipitated or chemically coagulated solids, and in this figure there are indicated certain modes of obtaining the $CO_2$ bearing gas employed, any one of which modes can be used alone or all of which can be simultaneously employed.

Figure 2:
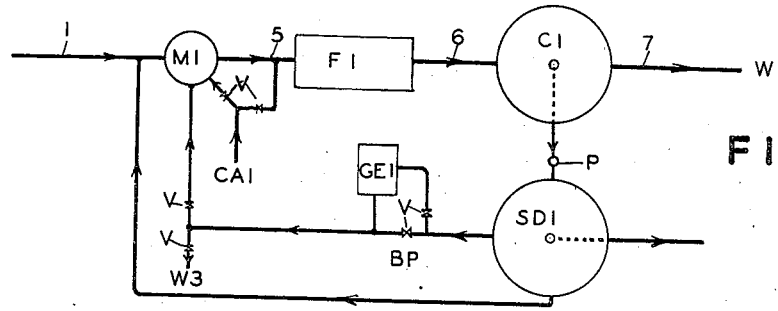

Figure 2 diagrammatically illustrates a simplified arrangement that employs certain of the fundamental arrangements that exist in that of Figure 1. It will be noted in the arrangement of this Figure 2 that settled sludge derived from the sedimentation or settling out of the chemically precipitated or chemically coagulated solids is passed to a digester from which the combustible gas resulting from the digester is directly employed as a $CO_2$ bearing gas or is utilized in a gas engine or other gas utilizing unit the exhaust or outflow gaseous product of which is employed as a $CO_2$ bearing gas.

Figure 3:
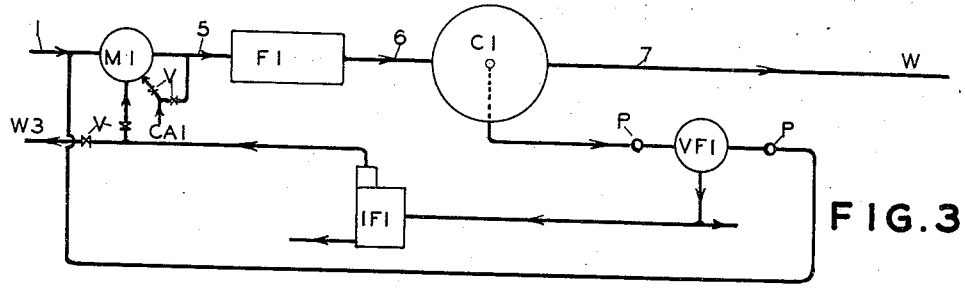

Figure 3 diagrammatically illustrates a simplified arrangement that employs certain of the fundamental arrangements that exist in that of Figure 1. It will be noted that according to Figure 3 the sludge obtained as the result of settling out chemically precipitated or chemically coagulated solids is passed to a mechanical filter for dewatering, thereafter the dewatered sludge is burned in an incinerator and a stack gas resulting from such burning is utilized to provide the $CO_2$ bearing gas that is employed in the process.

Figure 4:
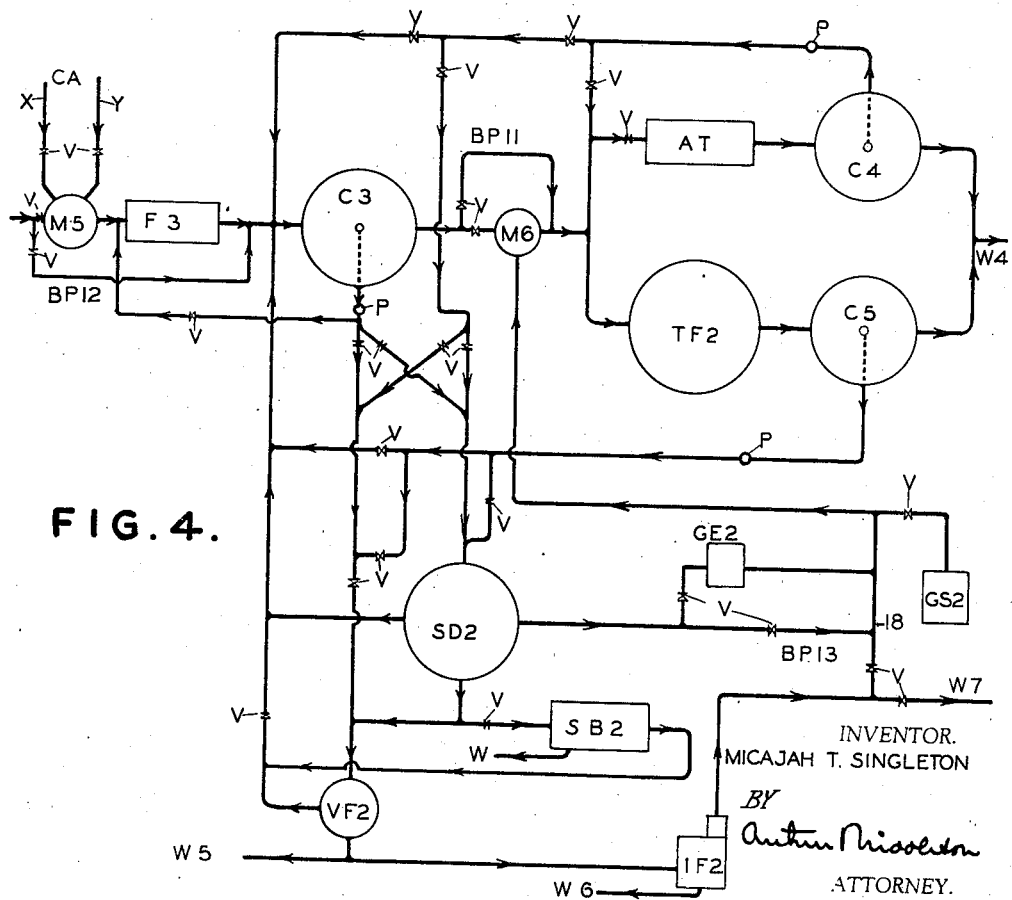

Figure 4 is a diagrammatic view illustrating an arrangement according to which an alkaline type of sewage is obtained and which is reduced as to its alkalinity by $CO_2$ bearing gas preparatory to realization of oxidation effects, as by an activated sludge process or by a trickling filter operation that is followed by clarification prior to disposal of the clarified effluent. This figure also shows different sources from which the $CO_2$ bearing gas may be obtained, and most of which sources are within the system itself.

Figure 5 illustrates a simple arrangement wherein sewage is subjected to sedimentation whereby the effluent passes along one path and the sewage sludge passes along another path to an anaerobic sludge digester, and an important feature of this arrangement resides in the employing of a mixer by which $CO_2$ bearing gas is intimately contacted with the sludge to effect a pH value adjustment prior to the introduction of the sludge into the digester.

The drawings will now be described in detail.

For ready reference, certain designating characters are listed below. They indicate certain apparatus, parts or devices employed in the systems illustrated and which are useful for treating sewage or the like. The parts indicated thereby are referred to elsewhere in the specification. The members or parts designated have in general the characteristics indicated.

AT designates an aeration tank or device wherein sewage or sewage sludge can be activated due to the introduction or mixing therewith of air, for example air which is blown into and delivered from perforated pipes or the like within the tank.

BP designates a bypass arrangement by which a certain part or section of the sewage treating system is bypassed or, as otherwise expressed, BP designates an arrangement employed for obtaining a split flow for the liquid as it passes along a particular section of the system.

C designates an apparatus wherein a sedimentation operation is carried out, such apparatus being frequently referred to as a clarifier.

CA designates a coagulating agent supply and generally it is a chemical or other material functioning to effect the coagulating or precipitating of coagulable material in the liquid and of the fine and/or colloidal solids suspended in the liquid undergoing treatment.

F designates apparatus wherein a liquid that has been chemically treated or that has been otherwise rendered in condition favorable to floc formation is subjected to gentle but positive agitation or agitative effects carried out in a manner favorable to the formation or production of flocs. Certain chemical apparatus for accomplishing the agitative effects above referred to is sold under the trade name "Flocculator." The word "floc" as employed herein is equivalent to the word "floccule."

GE designates a gas engine or other gas burning device, to wit an engine or gas burner and more particularly an engine or burner which is operated in the arrangement shown upon the combustible gas produced in a sludge digester.

GS designates a $CO_2$ bearing gas supply and more particularly a supply of gas obtained from outside sources.

IF designates an incinerating furnace, to wit a furnace in which dewatered sludge can be burned either by means of the heat derived entirely from the sludge itself or from fuel derived from an outside source as well as from the sludge being incinerated.

M designates an apparatus or device for intimately contacting or mixing a particular ingredient with liquid such as a $CO_2$ bearing gas in certain instances or as a coagulating agent in other instances.

P designates a pump suitable for use in causing or insuring a flow of either gas or liquid, as the case may be, in the proper direction as required.

RC designates a certain return conduit arrangement for effecting a return or recirculation of settled sludge or of a certain effluent liquid portion, as the case may be, from a certain section of the treating system to a preceding section thereof.

SB designates a sludge drying bed upon which sludge is received and dried by exposure to the atmosphere.

SD designates a sludge digester in which sewage sludge is anaerobically digested.

TF designates a trickling filter, to wit a construction according to the operation of which sewage sludge or the like is distributed over the top of a bed of assembled conglomerate material provided as by a bed composed of broken rocks, and allowed to trickle downwardly through the interstices in the presence of air and jelly-like bacterial or biological forms existing in the bed. According to the broader aspects of certain phases of this invention the trickling filter and its functioning may be viewed as illustrative of any suitable means or modes by which aerobic biological or oxidizing steps are realized.

V designates adjustable closure members as valves or shut-off gates which are employed in various pipes or conduits of the system.

VF designates a vacuum filter or other equivalent type of a mechanical dewatering device, to wit a device which can be relied upon for effecting a mechanical elimination or filtering of a substantial portion of the liquid component of sewage sludge and, for the purpose indicated, it is contemplated that a type of machine known as a centrifuge may be employed in and for the accomplishing of the mechanical dewatering.

W designates a pipe line or conduit leading to a locality away from the particular arrangement shown.

X designates a source of chemical which will aid or further bacterial action on a trickling filter or other biological sewage treatment device employed in the system.

The above reference characters are generally used in conjunction with a reference numeral in order to facilitate direct reference to a particular member, part or device.

Each of the arrangements illustrated can be employed in the treating of raw sewage, settled sewage, sewage sludge, trade waste liquid or liquors, or mixtures of the foregoing, and such may be referred to and included by the more general expression "liquids undergoing treatment."

*Arrangement of Figure 1*

The arrangement shown in this figure is relatively complete and affords opportunity for various modes of operation according to particular requirements or according to the wishes of a particular operator. It will be appreciated that it sometimes becomes advisable to change the operation of a treating plant of the type involved to take care of different conditions either seasonal, periodic, or otherwise, respecting the incoming liquid to be treated.

The incoming liquid enters along the path 1 and passes into the mixer MI wherein a $CO_2$ bearing gas is brought into intimate contact therewith. An acid coagulant passes from the source of supply CAI either directly into the mixer MI through the pipe 3 or into the line 5 through the pipe 4, according to whether valve V3 or V4 is open. Bypass BP1 can be employed to obtain a split flow part of which may be through the mixer M1 and part of which may be through the bypass BP1 to the line 5. The $CO_2$ bearing gas effects the desired pH value adjustment in the mixer M1 and the acid coagulant provides the coagulating and precipitating agent and becomes intimately mixed with the liquids thus treated thereby. The thus treated liquid is sometimes referred to as a chemically dosed liquid and it passes into the flocculator F1. Within the flocculator F1 a gentle agitative effect is carried out which is conducive to a floc formation.

By use of bypass BP1, for example, a split flow can be obtained according to which sewage can be highly carbonated in M1 and thereafter can be applied to or mixed with incoming sewage from the main flow as supplied through the bypass BP1. The acid coagulant which is added from the source of supply CA1 just referred to may be a ferric chloride $FeCl_3$, a ferric sulphate $Fe_2(SO_4)_3$, chlorinated copperas $FeCl.SO_4$, or alum $Al_2(SO_4)_3$. It will be noted that each of the acid coagulants just mentioned come under the broad classification of chemical reagents having strong acid radicals and in fact they represent reagents in which a strong acid radical is associated with a metallic element of high valence. From F1 the flocculated liquid passes along the path 6 into the clarifier C1. The supernatant liquid from the clarifier passes along the path 7 into the mixer M2, thence along the path 8 into the trickling filter TF1. The settled sludge obtained by the sedimentation in the clarifier C1 passes therefrom along to path 14. The handling of this sludge will be later referred to. Iron salts as from source X may be introduced into the mixer M2 wherein it is intimately contacted with the liquid undergoing treatment, and this is prior to the distribution of the liquid over the trickling filter TF1. The bypass BP2 permits the complete bypassing of the mixer M2 if desired, or it can be employed to provide a split flow part of which passes through the mixer M2 and part through the bypass BP2. The iron salt may be a ferrous salt $FeSO_4$ or any of the ferric salts previously mentioned and may be added for the purpose of aiding the biological action on the trickling filter. On the trickling filter TF1 bacterial or biological action takes place as the liquid trickles downwardly through the interstices of the bed of the filter in the presence of air, and the effluent from the trickling filter passes along the path 9 into the mixer M3. It will be borne in mind that a trickling filter when properly functioning has a jell-like growth which functions in the realizing of the desired bacterial or biological process referred to. An acid coagulant can be supplied to the liquid from the source of supply CA2 through the branch 14 or 15 dependent upon whether valve V14 or V15 is open. In this way the liquid from the trickling filter becomes chemically dosed prior to entering the "flocculator" F2 in which it is subjected to gentle but positive agitation of a character which aids or furthers the floc formation. A bypass BP3 is provided which, according to desire, can be relied upon for effecting a split flow, part of which will be through the mixer M3 and part of which will be through the bypass BP3, or if desired the bypass BP3 can be relied upon for completely bypassing the mixer M3. The liquid from F2 passes along a path 11 into the second clarifier C2 wherein it is subjected to a second sedimentation. The supernatant liquid then passes as effluent from the clarifier along the path 12 into a mixer M4, thence along the path 13 to W, to wit to a locality outside the treating apparatus. The mixer M4 may be employed to intimately contact air with the liquid passing therethrough so as to eliminate certain of the high $CO_2$ acidity effects and to avoid subsequent settling or after-precipitation which might otherwise follow. Bypass BP4 may be relied upon for completely bypassing the mixer M4 and for a direct delivery of the liquid to the outside locality W. Settled sludge, if returned into the system, can be relied upon to aid floc formation and also to physically aid in settling suspended solids, and in this connection a return conduit construction RC is provided with suitable valves therein according to which settled sludge from the clarifier C2 can pass along the path 20 for introduction by RC1 into the line ahead of the flocculator F1, by RC2 into the line ahead of the clarifier C1, and by RC3 into the line ahead of flocculator F2. The return to the points indicated may of course be to the desires of a particular operator.

In the operation of a plant or system such as herein outlined, it is advisable to have bypass arrangements for each of the several operating units whereby any one or more thereof can be either temporarily eliminated or partially bypassed for either a long or a short period according to the desires of a particular operator or according to operative requirements which may arise, and to that end other bypass arrangements are provided by such members as BP5, BP6, BP7, BP8 and BP9. With proper valves open it will be noted that liquid can be bypassed from the incoming line 1 through BP5, thence through BP6 into line 7, or through BP7 into line 9, or BP8 into line 11, or BP9 into line 13. Likewise liquid can be passed from line 7 through BP6 and thereafter through BP7 into line 9, BP8 into line 10, or BP9 into line 13. BP7 permits the passage of liquid from line 9 through BP8 into line 11 and BP9 into line 13, while BP8 permits the passage of liquid from line 11 through BP9 into line 13. Of course the operations just described contemplate the adjustment of the proper valves V for accomplishing the desired results.

The sludge from clarifier C1 is passed therefrom along path 14 by branch 16 leading to digester SD1 or by branch 17 into vacuum filter VF1. Sludge from the clarifier C2 can pass therefrom with the proper valves open along the paths 20, 21, 22 and 23 into the line 14 and from the latter by branch 16 or by branch 17 as the case may be into the digester SD1 or into the vacuum filter VF1 or into both the digester and the filter. In the digester the sludge is subjected to anaerobic digestion with the resulting production of a combustible gas bearing some $CO_2$, and therefrom the gas can pass directly to the gas engine or gas burner GE1 or it can be bypassed by BP10 into the line 18 from which there is a direct connection through a valve controlled branch to M3, or through another valve controlled branch to M1. The gas from the digester is of a character which will operate a gas engine or gas burner and the exhaust from the gas engine or burner is conducted so that it ultimately reaches the line 18 referred to, whereby the exhaust gas from this engine or burner can be utilized if desired as a $CO_2$ bearing gas.

Means are provided for conducting overflow liquor from the digester in a manner whereby it is returned to the system at a locality ahead of the mixer M1. Means are also provided so that the sludge from the digester can be withdrawn therefrom in a manner to pass some or all of the withdrawn sludge into the vacuum filter after conditioning with chemicals at CA3, or so that some or all of the withdrawn sludge can pass to the sludge drying bed or beds SB1. Part or all of the dewatered solids obtained from the filter operation are passed to waste or are passed into the incinerating furnace IF wherein it is burned, and the stack gases resulting from this burning operation are conducted to the pipe line 18 previously referred to and this provides another source of $CO_2$ bearing gas which can be employed in either the mixer M1 or the mixer M3. The line 18 has a pipe or section leading to W2, also if desired another pipe or section leading to W3, which, when open, allows a bleeding of $CO_2$ bearing gas to waste. Other forms of $CO_2$ bearing gas might be employed such as gas obtained as the result of burning coke, and a supply for such forms of $CO_2$ bearing gas other than those described as obtained from the sewage solids is indicated by GS1 and is connected by suitable piping to the line 18 previously referred to. Means are provided for conducting filtered liquid from the filter VF1 to the head of the system, namely into pipe 1.

It is to be noted that in the arrangement of this figure an activated sludge system may be substituted in place of the trickling filter TF1. The similarity of the activated sludge system and the trickling filter TF1 is that by each, aerobic bacterial oxidation is carried out and the bacterial aid supplied from X to the mixer M2 is helpful in realizing the desired bacterial effects.

Where chemical precipitation is employed in combination with biological treatment, such as by applying the chemically treated sewage to activated sludge treatment, trickling filter and the like, this process has particular application. Alkaline pH adjustment or extremely acid pH adjustment is apt to have inhibitive effects upon such bacterial action. The use of carbon dioxide gas for the purpose of reducing the chemical coagulant required may result in free $CO_2$ becoming entrained in the liquid undergoing treatment, and it is hereby pointed out that acidity due to such free or entrained $CO_2$ will be more quickly and readily overcome by the aeration or oxidizing which is a natural part of the activated sludge treatment or of the functioning of the trickling filter. In such instances the pH value is raised to a point which would be the optimum range for the bacterial action.

After coagulation and sedimentation as carried out for example in M3, F2 and C2, a very short period of aeration as in M3 will serve to free the clarified liquid of the excess $CO_2$ and raise the pH value, thus preventing after-precipitation effects.

Arrangement of Figure 2

Figure 2 is an arrangement which can be embodied in a relatively simple form of plant. According to the arrangement in this figure, the incoming liquid flows along the path 1 into the mixer M1, thence along the path 5 into the flocculator F1, thence along the path 6 into clarifier C1 from which the effluent passes along the path 7 to W which may be a locality outside of the treating system. The acid coagulating agent may be introduced into the mixer M1 or into the path 5 just prior to the introduction of the liquid into the flocculator. The $CO_2$ bearing gas is obtained as the result of passing the sludge from the clarifier into the digester SD1 from which the digester gas can be passed directly into the mixer or to W3, a locality outside of the system, if desired. Also according to this arrangement, if desired, the gas from the digester can be utilized in the gas engine or gas burner GE1 from which the exhaust gas can be passed into the mixer M1 or to W3, all of this according to the desires of a particular operator. It will be noted that the arrangement of this Figure 2 is practically a simple embodiment of a sub-section of the arrangement of Figure 1.

Arrangement of Figure 3

This illustrates another simple form embodying certain aspects of the invention. According to the arrangement of this Figure 3, the incoming liquid passes along the path 1 into the mixer M1, thence along the path 5 to flocculator F1. The liquid undergoing treatment has an acid coagulant supplied thereto either in the mixer M1 or in the line 5 ahead of the flocculator. An arrangement is made whereby the $CO_2$ bearing gas can be used as a pH value adjusting agent, the same as is true in the arrangement of Figures 1 and 2. Flocculator F1 functions to aid in the forming of flocs as desired, and therefrom the flocculated liquid passes along the path 6 into the clarifier C1 from which the clarified effluent passes along the path 7 to W and also from which the settled solids pass as sludge into the filter VF1. The dewatered sludge passed from the filter VF1 into the incinerating furnace IF and the stack gases therefrom are conducted as desired to the mixer M1 for use as a pH value adjusting agent, or to W3 which may be a locality outside of the system.

Arrangement of Figure 4

According to the arrangement of this figure, $CO_2$ bearing gas is employed as a pH value adjusting agent ahead of an operation in which the sewage, trade waste or other impure liquid, is subjected to an oxidizing effect. According to the arrangement of this figure, the incoming liquid enters the mixer M5 wherein a chemical dosing agent is added such as lime from a source X and an acid coagulating agent such as has been mentioned from source Y, and therefrom the liquid passes to a flocculator F3. A bypass BP12 is provided leading from the line ahead of M5 to the line leaving F3. The liquid passes from F3 into the clarifier C3 wherein it is subjected to a sedimentation operation. The supernatant liquid passes as effluent from the clarifier C3 into the mixer M6, thence along a pathway having one branch leading to an activated sludge aerating tank AT, and a branch leading to a trickling filter TF2. In AT the liquid is activated due to the introduction of air and therefrom the activated liquid passes into clarifier C4. From the trickling filter TF2 the liquid is subjected to the usual bacteriological and biological processes in the presence of air as an oxidizing agent. The effluent from the trickling filter ultimately passes to the clarifier C5. Clarifiers C4 and C5 mentioned lead to W4, to wit a locality which may be outside of the treating system. A bypass BP11 is provided by which the bypassing of the mixer M6 may be realized or by which a split flow of the liquid may be obtained according to which some will pass through the bypass BP11 and some through the mixer M6. In the mixer M6 a $CO_2$ bearing gas is introduced whereby there is realized in the mixer an intimate contacting of the $CO_2$ bearing gas. In this way a desired pH adjustment is realized. According to the operation of the arrangement shown in this figure it may be necessary only to bring the liquid undergoing treatment down to a pH value which is approximately 7 or even below that figure.

The arrangement of the parts shown in this figure is such that, if desired, sludge can be passed from the underflow of C3 into the line leading to F3. The underflow or sedimented solids from C4 can be passed to the digester SD2 or to the vacuum filter VF2. The sludge or underflow from either C4 or C5 or both can likewise be passed to either the sludge digester SD2 or to the vacuum filter VF2. The overflow from the sludge digester can be passed to the line leading to the clarifier or sedimentation apparatus C3. Settled solids can be passed from the sludge digester SD2 either to the sludge beds SB2 or to the vacuum filter VF2. From the sludge bed SB2 either the liquid passing therefrom, if there is any, or the solids removed therefrom, if there are any removed, can be passed to W, a locality outside of the system, or such liquid as may pass from the sludge bed can be passed along and into the line leading to the clarifier C3. Gas from the digester SD2 can be passed either to the gas engine or gas burner GE2 from which the exhaust gas passes into the line 18, or the gas from the digester can be caused to flow through a bypass BP13 leading directly to the line 18. This line 18 may be considered as a common line for receiving and transporting any $CO_2$ bearing gas to the mixer M6. The sludges which are passed to the vacuum filter VF2 are dewatered therein. The dewatered sludge can be disposed of by passing along the path leading to W5 which is a locality exterior of the system, or along a path leading to IF2 wherein the dewatered sludge is burned, from which a solid ash residue is passed to locality W6 which is outside the system. The effluent from the filter VF2 is returned to the system ahead of the clarifier C3. The stack gases or products of combustion are passed from the incinerator IF2 along a path leading to the line 18 heretofore referred to, or along a path leading to a locality which is exterior of the system, to wit, a locality W7. An outside source of $CO_2$ bearing gas is indicated at GS2 and this supply is connected by a line leading to line 18 heretofore referred to.

*Arrangement of Figure 5*

According to the arrangement of this figure, sewage enters along a path leading to clarifier C6 and flows into said clarifier wherein it is subjected to sedimentation. From the clarifier the effluent passes to W8. The settled sludge is passed from the clarifier to the mixer M where it is subjected to a pH value adjustment because of $CO_2$ bearing gas that is brought into intimate contact with the sludge as the mixer functions. From the mixer the $CO_2$ treated sewage is passed to the sewage sludge digester SD3 wherein it is subjected to anaerobic digestion. The digester gas, or at least some of it, is passed from the digester to the mixer M wherein it is utilized to provide the $CO_2$ required. Any digester gas not required for this operation can be passed to W9. The effluent from the digester is passed therefrom back into the system ahead of the clarifier. Solids remaining as the result of the digestion operation are passed from the digester to W10.

The flow sheet or arrangement of this figure is useful in the handling of a sludge obtained in the clarifier C6 that has high alkalinity because of the fact that the sewage entering the clarifier was highly alkaline. The passing of the alkaline sludge through the mixer and therein intimately contacting the sludge with the $CO_2$ and the digester gas, reduces or overcomes the high alkalinity so that by the treatment in the mixture the pH value is lowered to about pH7 preparatory to the introduction into the digester wherein anaerobic digestion takes place.

The following general remarks are in order as aiding in bringing out certain features that are within the scope and purview of the invention.

$CO_2$ can be generated by burning coke, oil or other fuel, or, in some cases, can be obtained from natural gas wells or even from the burning of the settled solids after they have been substantially dewatered, or even from the combustible gas realized by the digestion of sewage sludge. The carbon dioxide ($CO_2$), either in a pure state or diluted with other gases or as obtained as an ingredient or component of a $CO_2$ bearing gas, can be introduced into the sewage or other liquid by blowing it under pressure through submerged jets, perforated pipes, grids, porous plates or porous tubes, or by the use of a gas absorption tower through which a part of the sewage can be pumped and the gas introduced counter-currently. Tests indicate that it is best to apply the $CO_2$ before the coagulant but the $CO_2$ can be applied simultaneously or after the coagulant.

According to present-day practices the solid matter precipitated from the sewage is generally settled in clarifier tanks as sludge and removed to separate digestion tanks by mechanical means or is settled into the lower digestion chamber of two-story sedimentation and digestion tanks. The settled sludge then undergoes decomposition or digestion through anaerobic bacterial action. The gas given off as a product of such digestion usually amounts to about 1 cu. ft. per day per capita connected to the sewer. This gas is about 30% carbon dioxide. The remaining 70% of the digested gas is largely methane.

In carrying out the process of the present invention according to an arrangement in which a sludge digester SD is employed, there results a digester gas having chemical characteristics above indicated. It will therefore be appreciated that the digester gas of the arrangement shown can be directly employed as a $CO_2$ bearing gas that is suitable for the carrying out of the present invention. Sewage sludge digester gas is combustible and since carbon dioxide is a product of combustion, the methane can be burned and the flue gases from the burner used as an added source of carbon dioxide. According to the present invention the digester gases can be first passed through the sewage to utilize the $CO_2$ in the natural gas, the methane can then be recovered and burned for heating purposes or used in internal combustion engines for generating power. For whatever purpose the gases are used, the flue gases or exhaust gases are a source of $CO_2$. Where sludge, either in the raw state or digested is burned in incinerators or where screenings are so burned, the flue gases of such operations are also a source of $CO_2$.

I claim:

1. In the treating of sewage, trade wastes, impure waters and the like having organic matter constituting impurities therein, the method which comprises mixing with the liquids being treated a dosing chemical reagent having a strong acid radical for coagulating and precipitating a substantial portion of the coagulatable organic matter, subjecting the resulting dosed liquid to an initial sedimentation operation, withdrawing supernatant liquid along one path and sedimented sludge along another path, intimately contacting a $CO_2$ bearing gas with the withdrawn supernatant in a manner whereby the $CO_2$ bearing gas operates as a pH value adjusting agent, thereafter exposing the withdrawn supernatant liquid which still has some organic matter therein to biological action in the presence of an oxidizing atmosphere, subjecting the biologically acted upon supernatant liquid to a second sedimentation, withdrawing the supernatant liquid of the second sedimentation along one path and the settled sludge of the second sedimentation along another path.

2. In the treating of sewage, the method which comprises lowering the pH value of incoming sewage by intimately contacting therewith $CO_2$ bearing gas, thereafter mixing therewith as a dosing chemical a reagent having a strong acid radical which is employed for coagulating and precipitating certain of the organic matter in the incoming sewage, subjecting the thus dosed sewage to sedimentation for effecting a pre-clarification step, withdrawing the settled solids along one path and the supernatant liquid along another path, further dosing the withdrawn supernatant liquid with an acid metallic salt and exposing said treated liquid to a biological action in the presence of an oxidizing gas, withdrawing the liquid and certain solid products of said biological action and subjecting the same to a second sedimentation for effecting a further clarification step, and passing the supernatant liquid from said second sedimentation along one path and the settled solids along another path.

3. In the treating of sewage, trade wastes, impure waters and like liquids having organic matter constituting impurities therein, the method which comprises intimately contacting a $CO_2$ bearing gas with the liquid in a manner whereby the $CO_2$ bearing gas operates as a pH value adjusting agent, thereafter exposing the liquid which still has some organic matter therein to biological action in the presence of an oxidizing atmosphere, subjecting the biologically acted upon liquids to sedimentation, and withdrawing the supernatant liquid of said sedimentation along one path and the settled sludge thereof along another path.

4. In the treating of sewage, trade wastes, impure waters and like liquids having organic matter constituting impurities therein, the method which comprises subjecting the liquid to an initial sedimentation operation, withdrawing supernatant liquid along one path and sedimented sludge along another path, intimately contacting a $CO_2$ bearing gas with the withdrawn supernatant in a manner whereby the $CO_2$ bearing gas operates as a pH value adjusting agent, thereafter exposing the withdrawn supernatant liquid which still has some organic matter therein to biological action in the presence of an oxidizing atmosphere, subjecting the biologically acted upon supernatant liquid to a second sedimentation, withdrawing the supernatant liquid of the second sedimentation along one path and the settled sludge of the second sedimentation along another path.

5. In the treating of sewage, trade wastes, impure waters and like liquids having organic matter constituting impurities therein, the method which comprises mixing with the liquids being treated a chemical reagent for coagulating and precipitating a substantial portion of the coagulatable organic matter, separating coagulated organic matter from the liquid thereafter, intimately contacting a $CO_2$ bearing gas with the liquid in a manner whereby the $CO_2$ bearing gas operates as a pH value adjusting agent, subsequently exposing the liquid which still has some organic matter therein to biological action in the presence of an oxidizing atmosphere, subjecting the biologically acted upon liquid to sedimentation, withdrawing the supernatant liquid of said sedimentation along one path, and passing the settled sludge of said sedimentation along another path.

6. In the treating of sewage and other impure liquids having organic impurities therein, the method which comprises lowering the pH value of incoming liquid by intimately contacting therewith $CO_2$ bearing gas, thereafter subjecting the liquid to sedimentation for effecting a pre-clarification step, withdrawing the settled solids along one path, passing the supernatant liquid along another path and exposing it to biological action in the presence of an oxidizing gas, withdrawing the liquid and certain solid products of said biological action and subjecting the same to a second sedimentation for effecting a further clarification step, passing the supernatant liquid from said second sedimentation along one path, and passing the settled solids along another path.

7. In the treating of sewage, trade wastes, impure waters and like liquids having organic matter constituting impurities therein, the method which comprises intimately contacting a $CO_2$ bearing gas with the liquid being treated in a manner whereby the $CO_2$ bearing gas operates as a pH value adjusting agent, thereafter mixing a chemical reagent having a strong acid radical, subsequently exposing the liquid to biological action in the presence of an oxidizing atmosphere, subjecting the biologically acted upon liquid to a sedimentation, and withdrawing the supernatant liquid of said sedimentation along one path and the settled sludge along another path.

8. In the treating of sewage and analogous impure liquids, the method which comprises lowering the pH value of incoming liquid by intimately contacting therewith $CO_2$ bearing gas, thereafter subjecting the liquid to sedimentation for effecting a pre-clarification step, withdrawing the settled solids along one path and the supernatant liquid along another path, dosing the withdrawn supernatant liquid with an acid metallic salt, exposing said dosed supernatant liquid to a biological action in the presence of an oxidizing gas, withdrawing the liquid and certain solid products of said biological action and subjecting the same to a second sedimentation for effecting a further clarification step, passing the supernatant liquid from said second sedimentation along one path and passing the settled solids from said second sedimentation along another path.

MICAJAH T. SINGLETON.